United States Patent
Xie et al.

(10) Patent No.: US 8,825,720 B1
(45) Date of Patent: Sep. 2, 2014

(54) SCALING ASYNCHRONOUS RECLAMATION OF FREE SPACE IN DE-DUPLICATED MULTI-CONTROLLER STORAGE SYSTEMS

(75) Inventors: Ying Xie, Cupertino, CA (US); Srikant Varadan, Sunnyvale, CA (US); Fabiano Botelho, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/085,377

(22) Filed: Apr. 12, 2011

(51) Int. Cl.
  *G06F 12/00* (2006.01)
  *G06F 17/30* (2006.01)
(52) U.S. Cl.
  CPC ................... *G06F 17/30156* (2013.01)
  USPC .......................................... 707/813; 707/694
(58) Field of Classification Search
  CPC ..................... G06F 17/30539; G06F 17/30011
  USPC ................... 707/694, 821, 814, 816
  See application file for complete search history.

(56) References Cited

U.S. PATENT DOCUMENTS

| | | | | |
|---|---|---|---|---|
| 6,931,487 B2 * | 8/2005 | Lubbers et al. | ............... | 711/114 |
| 7,299,325 B1 * | 11/2007 | Waterhouse et al. | ......... | 711/159 |
| 7,519,635 B1 * | 4/2009 | Haustein et al. | ....................... | 1/1 |
| 7,904,423 B2 * | 3/2011 | Vermeulen et al. | ........... | 707/626 |
| 7,949,662 B2 * | 5/2011 | Farber et al. | .................. | 707/747 |
| 8,086,799 B2 * | 12/2011 | Mondal et al. | ................. | 711/116 |
| 8,108,446 B1 * | 1/2012 | Christiaens | .................... | 707/816 |
| 8,108,447 B2 * | 1/2012 | Guo | ............................. | 707/816 |
| 8,108,638 B2 * | 1/2012 | Kishi | ............................. | 711/162 |
| 8,131,687 B2 * | 3/2012 | Bates et al. | .................... | 707/692 |
| 8,321,648 B2 * | 11/2012 | Condict | ......................... | 711/170 |
| 8,380,688 B2 * | 2/2013 | Gruhl et al. | .................... | 707/698 |
| 2009/0037491 A1 * | 2/2009 | Cachin et al. | .................. | 707/201 |
| 2009/0182789 A1 * | 7/2009 | Sandorfi et al. | ............... | 707/204 |
| 2009/0234892 A1 * | 9/2009 | Anglin et al. | .................. | 707/201 |
| 2009/0259701 A1 * | 10/2009 | Wideman et al. | ............. | 707/206 |
| 2010/0064166 A1 * | 3/2010 | Dubnicki et al. | ................. | 714/4 |
| 2010/0082558 A1 * | 4/2010 | Anglin et al. | .................. | 707/694 |
| 2010/0088296 A1 * | 4/2010 | Periyagaram et al. | ........ | 707/705 |
| 2010/0094817 A1 * | 4/2010 | Ben-Shaul et al. | ........... | 707/697 |
| 2010/0106933 A1 * | 4/2010 | Kamila et al. | ................. | 711/171 |
| 2010/0235333 A1 * | 9/2010 | Bates et al. | .................... | 707/692 |
| 2010/0250896 A1 * | 9/2010 | Matze | ............................. | 711/216 |
| 2011/0099154 A1 * | 4/2011 | Maydew et al. | .............. | 707/692 |
| 2011/0283085 A1 * | 11/2011 | Dilger et al. | ................... | 711/216 |
| 2012/0323859 A1 * | 12/2012 | Yasa et al. | ...................... | 707/692 |

* cited by examiner

*Primary Examiner* — Miranda Le
(74) *Attorney, Agent, or Firm* — Van Pelt, Yi & James LLP

(57) ABSTRACT

Scaling Asynchronous reclamation of free space in de-duplicate multi-controller storage systems is disclosed. In one example, a set of de-duplicated data segments/blocks organized in a hierarchical data structure is received, the set of de-duplicated data segments/blocks are allocated across a plurality of controllers of the file system, where each de-duplicated data segment is restricted to be co-allocated to the same controller as the reference(s) referencing the de-duplicated data segment/block in the hierarchical data structure. In various embodiments, the file system is traversed, each controller of the file system updates its own local live vector and reclaim storage space that are not marked as alive.

21 Claims, 8 Drawing Sheets

SCALING ASYNCHRONOUS RECLAMATION OF FREE SPACE IN DE-DUPLICATED MULTI-CONTROLLER STORAGE SYSTEMS

BACKGROUND OF THE INVENTION

Reclaiming unused storage space in de-duplicated file systems is challenging because files share data segments or data chunks. Once a file is deleted, storage space assigned to its data segments or data chunks may not be reclaimed unless they are not shared by other files. Mark-and-sweep garbage collection approach has been used to solve this problem. This approach typically includes the steps of traversing the entire file system, marking all data segments used in the file system as alive, and reclaiming storage space taken up by all unused data segments. However, such an approach is currently not scalable in de-duplicated multi-controller file systems since it is largely a synchronous process and conflicts often arise and must be resolved when multiple controllers are attempting to access the same data segment or data block. As such, an improved method for reclaiming unused storage space in a de-duplicated multi-controller file system is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
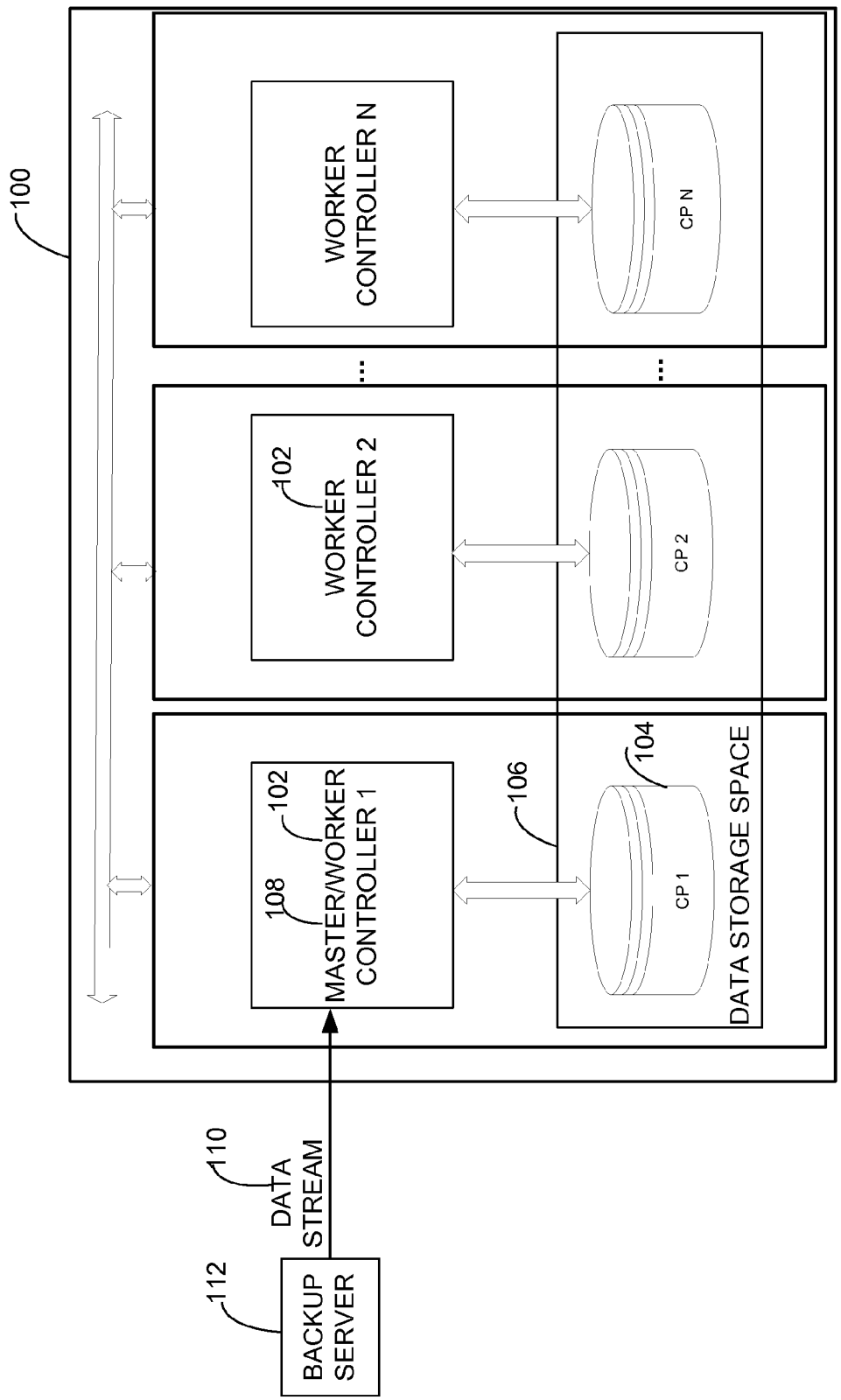
FIG. 1 is block diagram illustrating a de-duplicated multi-controller file system, embodiment 100 according to the present invention.

FIG. 1 is a block diagram illustrating a de-duplicated multi-controller file system, embodiment 100, according to the present invention. The file system 100 includes a plurality of worker controllers 102 each managing one or more storage collection partitions (only one collection partition per controller is shown for simplicity) 104 of the storage space 106 of the file system 100. The file system 100 also includes at least a master controller 108. In the example shown, the master controller 108 also functions as a worker controller 102. In various other embodiments, the master controller 108 can be a separate controller separate from the worker controllers. The functional divisions of the master and worker controllers in accordance with various embodiments will be discussed below in reference to other Figures. The file system 100 receives data stream 110 transmitted by one or more data sources (e.g., backup servers) 112 and stores the data stream as de-duplicated data segments organized in hierarchical data structures. The de-duplicated data segments are proportioned or allocated across the plurality of worker controllers 102 for storage in the associated storage collection partitions 104. The plurality of worker controllers 102 each manages one or more collection partitions assigned to the controller and do not share storage space with other worker controllers. One controller does not have access to the storage space of another controller. The master controller is in communication with each of the plurality of worker controllers.

Figure 2:
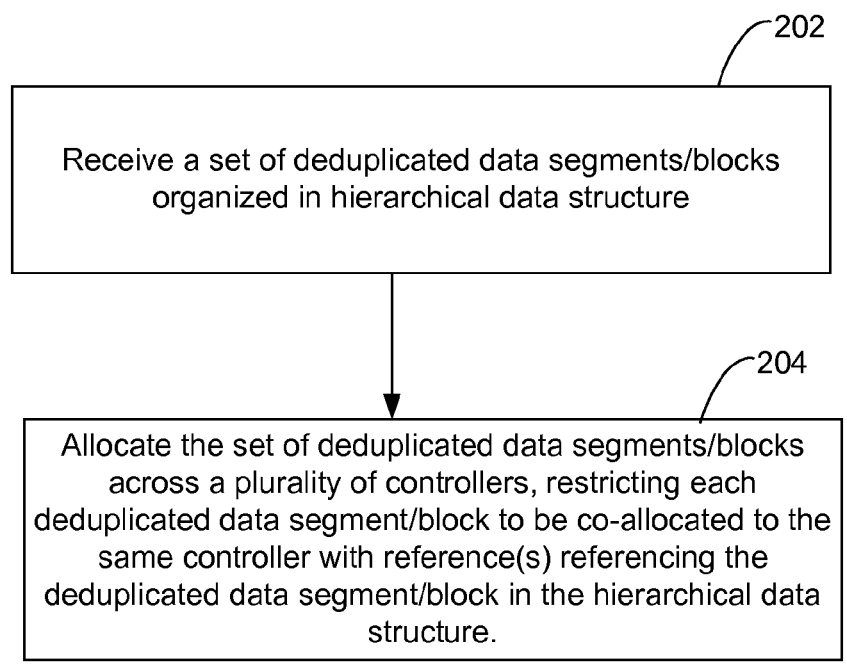
FIGS. 2 and 3 illustrate embodiments of a process for processing data in a de-duplicated multi-controller file system.

FIG. 2 illustrates an embodiment of a process for processing data in a de-duplicated multi-controller file system.

At 202, a set of de-duplicated data segments organized in a hierarchical data structure is received. In various embodiments, the hierarchical data structure represents one or more data files and can be used to re-construct the data files. In various embodiments, the hierarchical data structure includes de-duplicated data segments of the data files and one or more successive levels of references leading to the data files. In various embodiments, the hierarchical data structure includes a segment tree structure such as a hash tree structure such as a Merkel tree structure.

At 204, the set of de-duplicated data segments are allocated across a plurality of controllers, where each of the plurality of controllers manages one or more storage collection partitions of the file system, and where each of the de-duplicated data segments and reference(s) referencing the de-duplicated data segment are restricted to be allocated to the same controller.

In various embodiments, the hierarchical data structure includes a hash tree structure such as a Merkel tree structure. In various embodiments, the set of de-duplicated data segments form the bottom level (denoted as L0 level) of the hierarchical data structure. The set of de-duplicated L0 segments are allocated across the plurality of controllers while restricting each of the de-duplicated data segments to be co-allocated to the same controller with reference(s) referencing the de-duplicated L0 segment in the hierarchical data structure. In various embodiments, the reference(s) referencing the L0 data segment are stored in metadata segments denoted as L1s.

Since the majority of computation in traversing data files is carried out at the L0 and L1 level (since there are a lot more of L0 and L1 data segments/blocks than other types of data segments/blocks), limiting L0 and L1 data segments/blocks to the same controller and associated storage space minimizes chattering between controllers and localizes the computation needed to traverse data files to the local controller. This increase the scalability of the file system since adding an additional controller will localize the added computation to the added controller and will minimize burden to the existing master and worker controllers.

Figure 3:
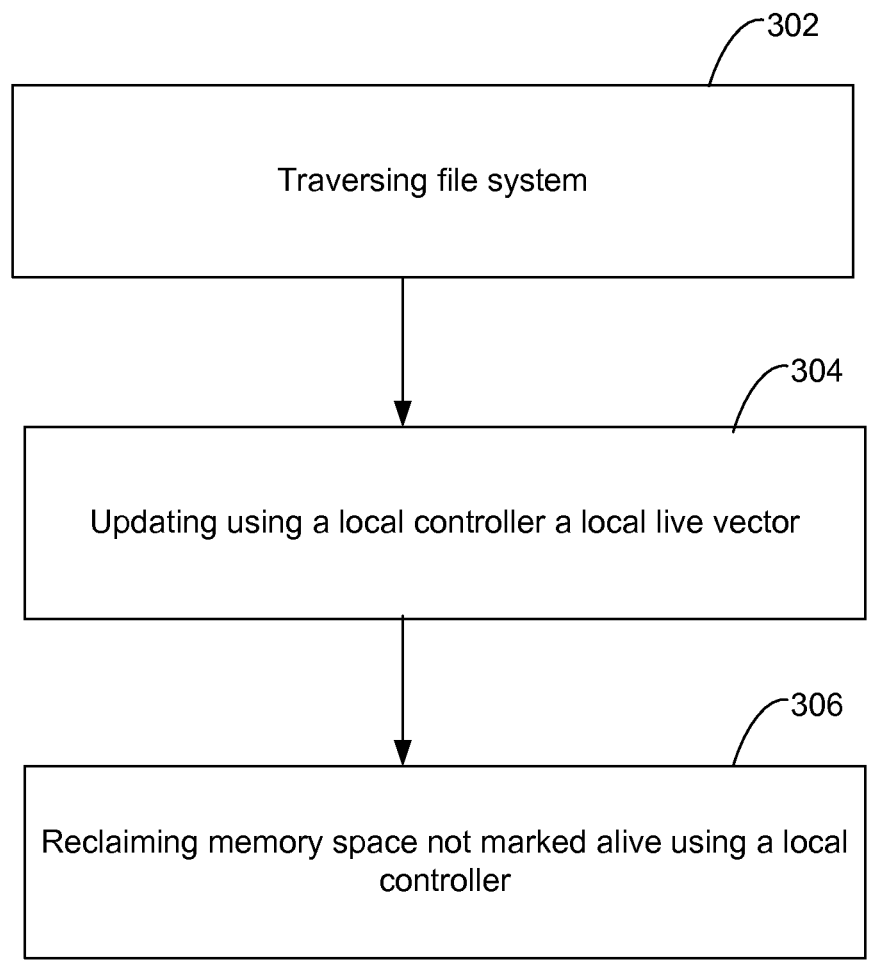

FIG. 3 illustrates an embodiment of a process for processing data in a de-duplicated multi-controller file system. The multi-controller file system shares a single namespace. At 302, all files of the file system are traversed, file path are executed. At 304, if a data segment or data chunk is referenced or otherwise used by a data file of the file system, a local controller updates a local live vector to indicate that the data segment is alive. The local controller manages one or more collection partitions (local storage space) associated with the local controller. The local live vector is maintained by the local controller and can only be updated by the local controller. The local controller updates the local live vector whenever a data segment/data chunks under its management is referenced by a file of the file system. At 306, once the entire file system has been traversed and all relevant local live vectors of the file system updated, storage spaces that are not marked alive are reclaimed by local controllers. For example, a first storage space allocated to a first data segment located in a first collection partition and managed by a first controller is reclaimed by the first controller if a local live vector associated with the first data segment and local to the first controller and the first collection partition indicates that the first data segment is not alive, a second storage space allocated to second data segment located in a second collection partition managed by a second controller is reclaimed by the second controller if a local live vector associated with the second data segment and local to the second controller and the second collection partition indicates the second data segment is not alive, and so on so forth.

Figure 4:
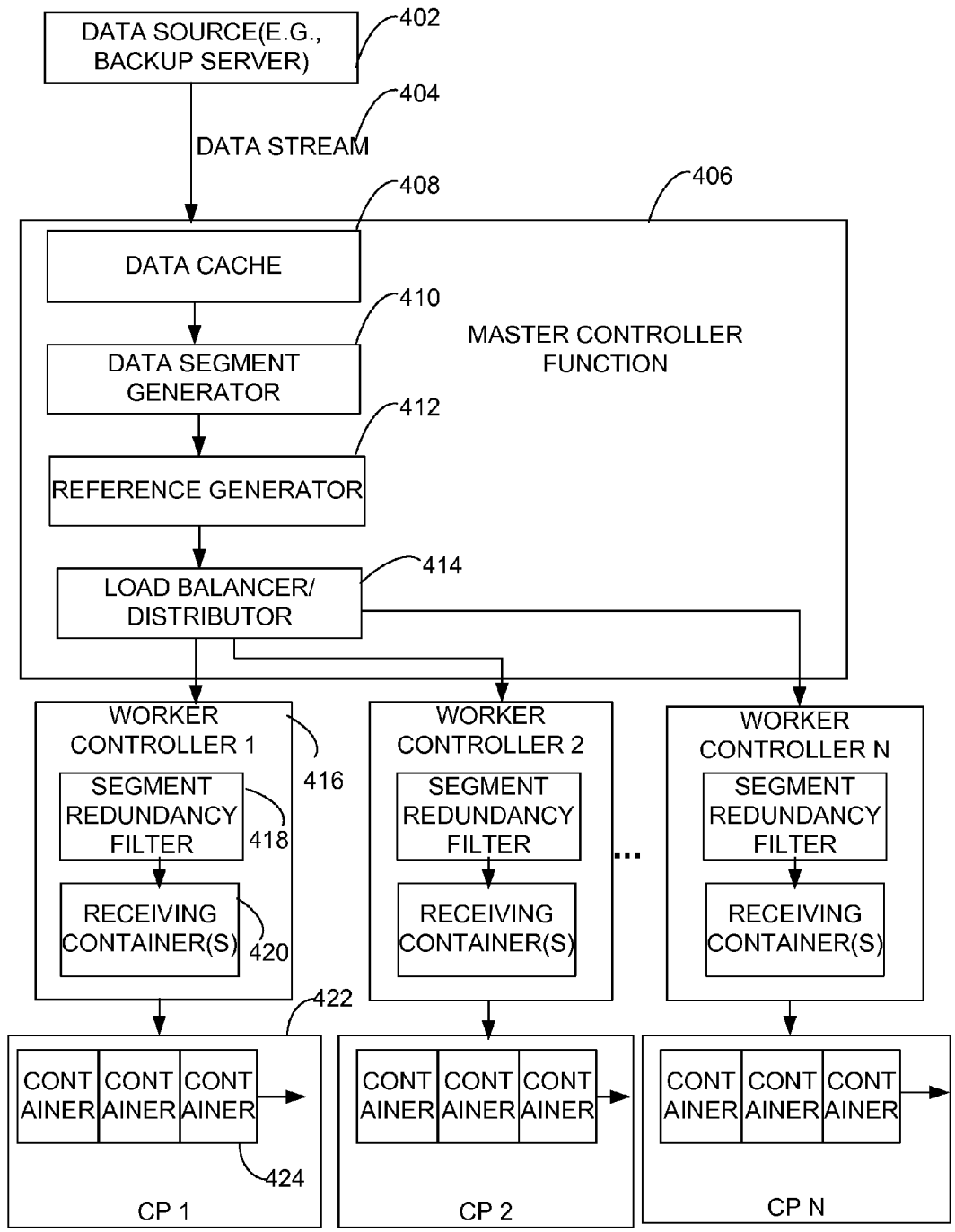
FIGS. 4 and 5 present block diagrams illustrating a de-duplicated multi-controller file system in accordance to an embodiment.

FIG. 4 is a block diagram illustrating a de-duplicated multi-controller file system in accordance to an embodiment. Although a single master is shown, multiple master controllers are possible. Although three worker controllers are shown, any other numbers of worker controllers are possible. The example illustrates the functional division of master and worker controller. Although the master controller is shown as functionally separate from worker controllers, in various embodiments, the master controller and a worker controller can be a single controller as shown in FIG. 1.

In the example shown, one or more data sources 402 such as one or more backup servers transmit data stream (e.g., one or more data files) 404 to a de-duplicated multi-controller file system 406. The data stream 404 is buffered in a data cache 408. Once the data cache reaches a certain level, the data is sent to a data segment generator 410 which breaks the data stream into contiguous data segments. The generated data segments are passed to a reference generator 412 which generates references to each of the contiguous data segments. In various embodiments, references to the references to the data segments are generated. In various embodiments, cascading levels of references leading to the data segments are generated. The data segments and the references can be organized in a hierarchical data structure such as a segment tree such as a hash tree. In various embodiments the hierarchical data structure includes a Merkel tree. The data segments and the references are then passed to a load balancer/distributor 414 which distributes the data segments and references across a plurality of worker controllers 416 of the file system for storage in associated one or more collection partitions 422. The distribution may be carried out according to a policy. The policy may be a load balancing policy based on various parameters such as data access pattern, storage capacity, service agreement, quality of service guarantee, data source, and/or data type, etc. In various embodiments, the data segments and references are evenly distributed across the plurality of controllers. In various embodiments, each de-duplicated data segment and reference(s) referencing the data segment/block are restricted to be allocated in the same worker controller. Each of the worker controllers 416 includes a local segment redundancy filter 418 which filters out duplicate copies of identical data segments in the received data segments to generate a set of de-duplicate data segments. The de-duplicated data segments and references are passed to one or more receiving containers 420 of the local worker controller 416. Once one or more receiving containers are filled, they are passed to be stored in the associated storage collection partitions 422. In the example shown, the worker controllers 416 append the content of a receiving container to the end of an append-only log 424. In various embodiments, the de-duplicated data segments and the references are packed in different receiving containers. In various embodiments, the de-duplicated data segments and each reference level of the hierarchical data structure are packed in different receiving containers. In various embodiments the de-duplicated data segments and the corresponding reference(s) referencing the data segments are restricted to be packed in the same receiving container.

Figure 5:
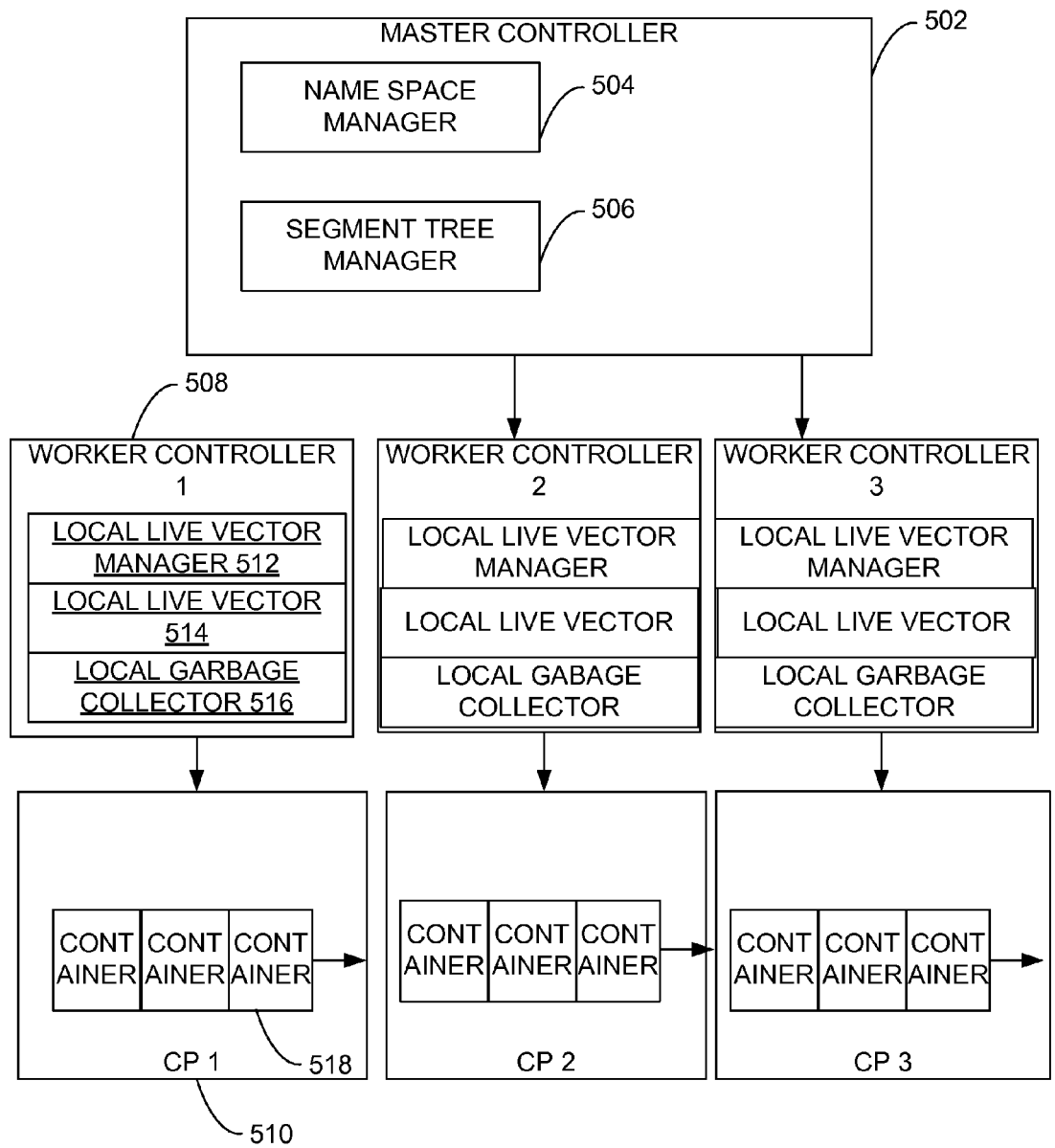

FIG. 5 is a block diagram illustrating a de-duplicated multi-controller file system in accordance to an embodiment. Although a single master is shown, multiple master controllers are possible. Although three worker controllers are shown, any other numbers of worker controllers are possible. The example illustrates the functional division of master and worker controller. Although the master controller is shown as functionally separate from worker controllers, in various embodiments, the master controller and a worker controller can be a single controller as shown in FIG. 1.

The master controller 502 is shown to include a namespace manager 504 and a segment tree manager 506. Each worker controller 508 manages one or more corresponding storage collection partitions (only one collection partition per worker controller is shown for simplicity) 510. Each of the worker controllers includes a local live vector manager 512 that maintains a local live vector 514 and a local garbage collector 516. The entire file system includes a single unified namespace that contains a logical grouping of unique identifiers for one or more data files. In the example shown, the namespace includes a directory of the file system that contains references to inodes of data files managed under the namespace. An inode of a data file stores the top level reference (root) of hierarchical data structure (e.g., segment tree structure) representing the data file. The top level reference allows the hierarchical data structure to be accessed.

During the mark phase of a mark-and sweep garbage collection operation, the namespace manager, segment tree manager, and local controllers work cooperatively to traverse the entire file system and execute all the file paths of the file system. Local worker controllers each updates a locally maintained live vector to indicate a locally stored data segment or data chunk 518 is alive when the data segment or data chunk is referenced by one or more files managed in the namespace. For example, if data segment A stored in collection partition A managed by controller A is referenced by a data file of the namespace, controller A updates a local live vector A to indicate that segment A is alive. The local live vector A can only be updated by controller A, other controllers are not allowed to update the local live vector A of controller A. Maintaining local live vectors adds to the scalability of the de-duplicated multi-controller file system, since adding on a new controller will localize the computation of updating live vectors for the added controller to the new controller. Existing master and worker controllers will not see their work load increase significantly.

During the memory reclaiming phase of a mark-and-sweep garbage collection operation, a local controller reclaims memory storage spaces (e.g., data segments or chunks) that are not marked alive in a local live vector maintained by the local controller. For example, if data segment A stored in collection partition A managed by controller A is marked as alive by controller A, the garbage collector reclaims the memory storage space and put it back into the common storage system. In various embodiments, reclaiming memory storage spaces (sweeping) include copying over only memory storage spaces marked as alive to a new location (e.g., new data container), such as the end of an append-only log. In various embodiments, reclaiming memory storage space using a local controller increases the scalability of the de-duplicated multi-controller file system. When a new controller and associated storage space is added, existing master and worker controllers do not need to perform additional duties. The added work load in reclaiming operation is localized to the added controller.

Figure 6:
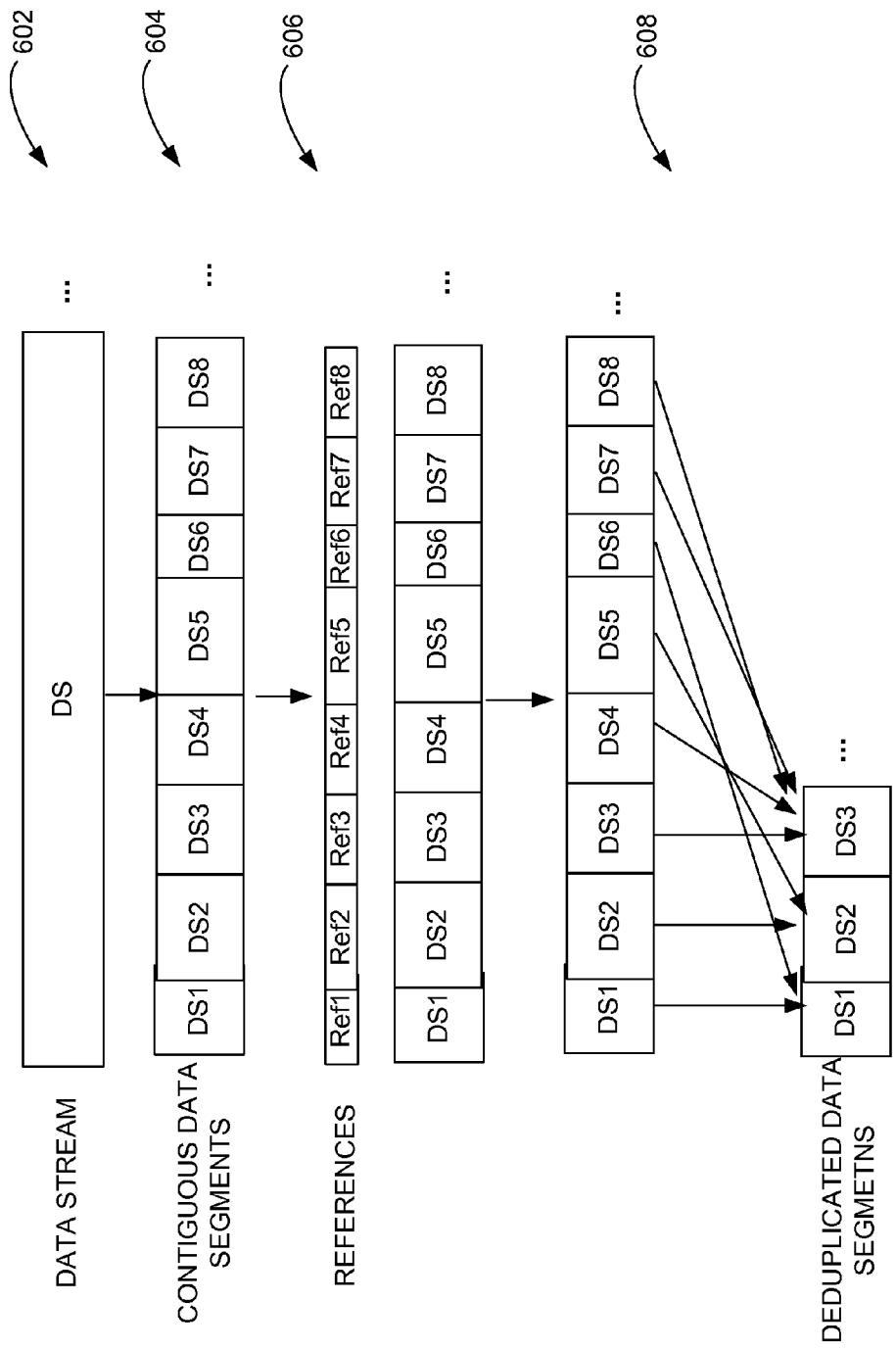
FIG. 6 is a block diagram illustrating an embodiment of a process for generating a set of contiguous data segments from a data stream.

FIG. 6 is a block diagram illustrating an embodiment of a process for generating a set of contiguous data segments from a data stream. At 602, a data stream is received, for example from a backup server. At 604, the data stream is broken down into a set of contiguous data segments. In various embodiments, the data segments are variable in size. In various embodiments, the data segments have fixed size. In various embodiments, the data segments are generated based on one or more of the following factors: contents, access pattern, and data type. At 606, references are generated for the data segments. At 608, the data segments are de-duplicated by eliminating redundant copies of identical data segment.

Figure 7:
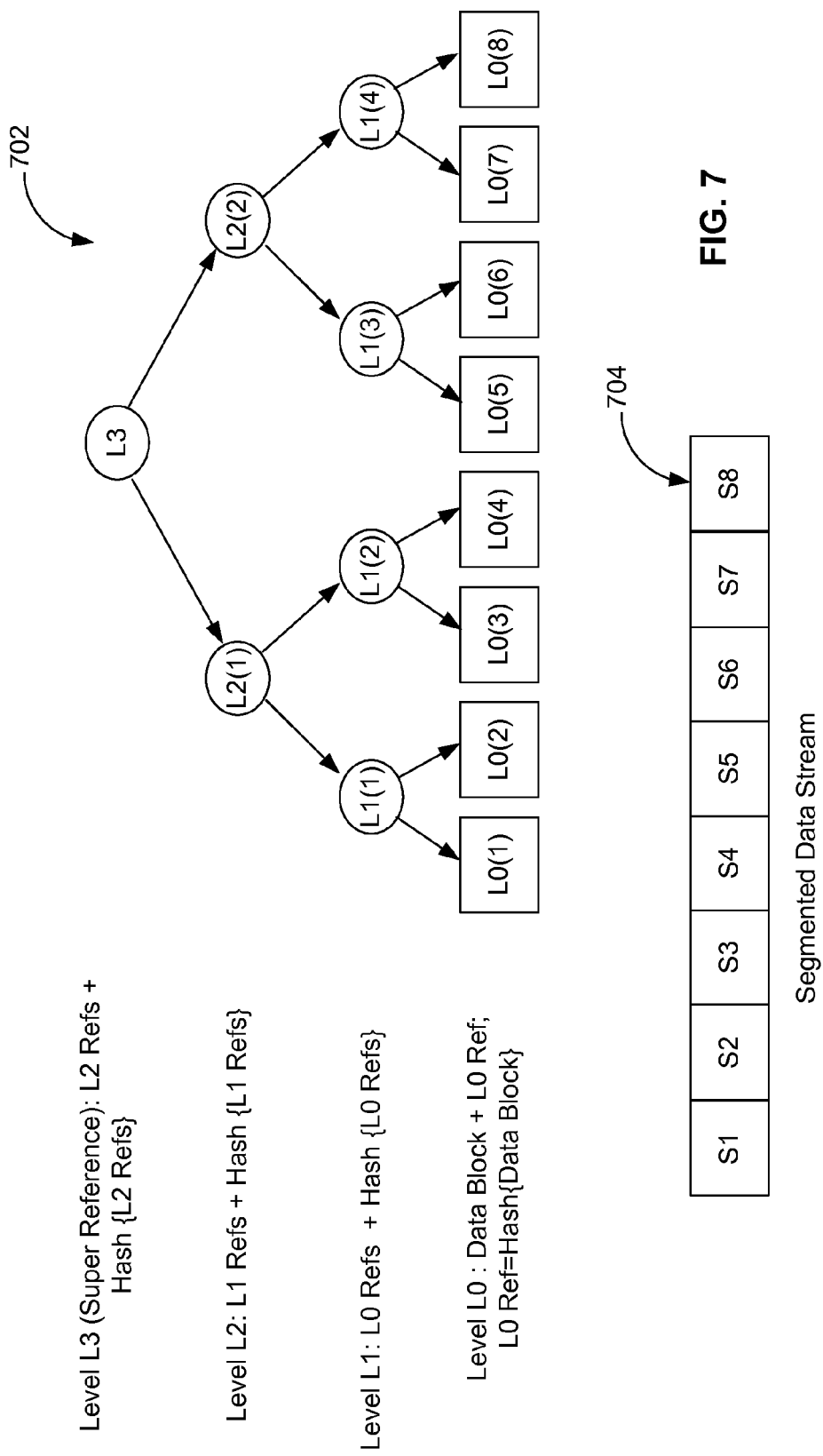
FIG. 7 is a block diagram illustrating hierarchical data structure in accordance with an embodiment.

FIG. 7 is a block diagram illustrating hierarchical data structure 702 representing a data stream 704 in accordance with an embodiment. The example shows a Merkel tree having 4 levels of data. In various embodiments, the Merkel tree can have more or less than 4 levels of data. In some embodiments it can go up to 6 levels. Although the example shows a binary Merkel tree having a span of 2 where each parent node includes two child nodes, other Merkel tree configuration where span is greater than 2 is possible. In various embodiments, the span for one level may vary from span of another level. In various embodiments, the span of one node in a level can be different from the span of another node in the same level. Each node or leave of the Merkel tree shown includes a data segment/block that includes a data portion and metadata portion. The metadata portion includes a hash of the data portion. The hash is also a reference that can serve as a pointer to the location storing the data portion. The metadata portion may also include other information such as the type and size of the data segment/block (node). The data portion of a parent node includes the hash value of its child nodes. For example, node L0(1) of the Merkel tree includes data segment/block S1 of the data stream as its data portion and a hash of data segment/block S1 as its reference (L0(1) reference) and as at least a part of its metadata portion. The same happens for L0(2) and other nodes, so on and so forth. Node L1(1) is a parent node of L0(1) and L0(2). The data portion of node L1(1) includes the references for L0(1) and L0(2) (or L0(1) reference and L0(2) reference), where L0(1) reference is a hash of L0(1) data segment/bock and L0(2) reference is a hash of L0(2) data block. The metadata portion of node L1(1) includes reference to L1(1) (also denoted as L1(1) reference). The reference for L1(1) is computed based on the data portion of L1(1) which is L0(1) reference plus L0(2) reference. Node L2(1) is a parent node of L1(1) and L1(2). The data portion of the node L2(1) includes the reference for L1(1) plus reference to L1(2). The metadata portion of L2(1) includes the reference for L2(1) which is a hash of L2(1) data portion. L3 node is the root node or super reference of the Merkel tree. The data portion of node L3 includes the references for L2(1) and L2(2). The metadata portion of L3 includes the reference to L3 which is a hash of content L3 data portion.

Figure 8:
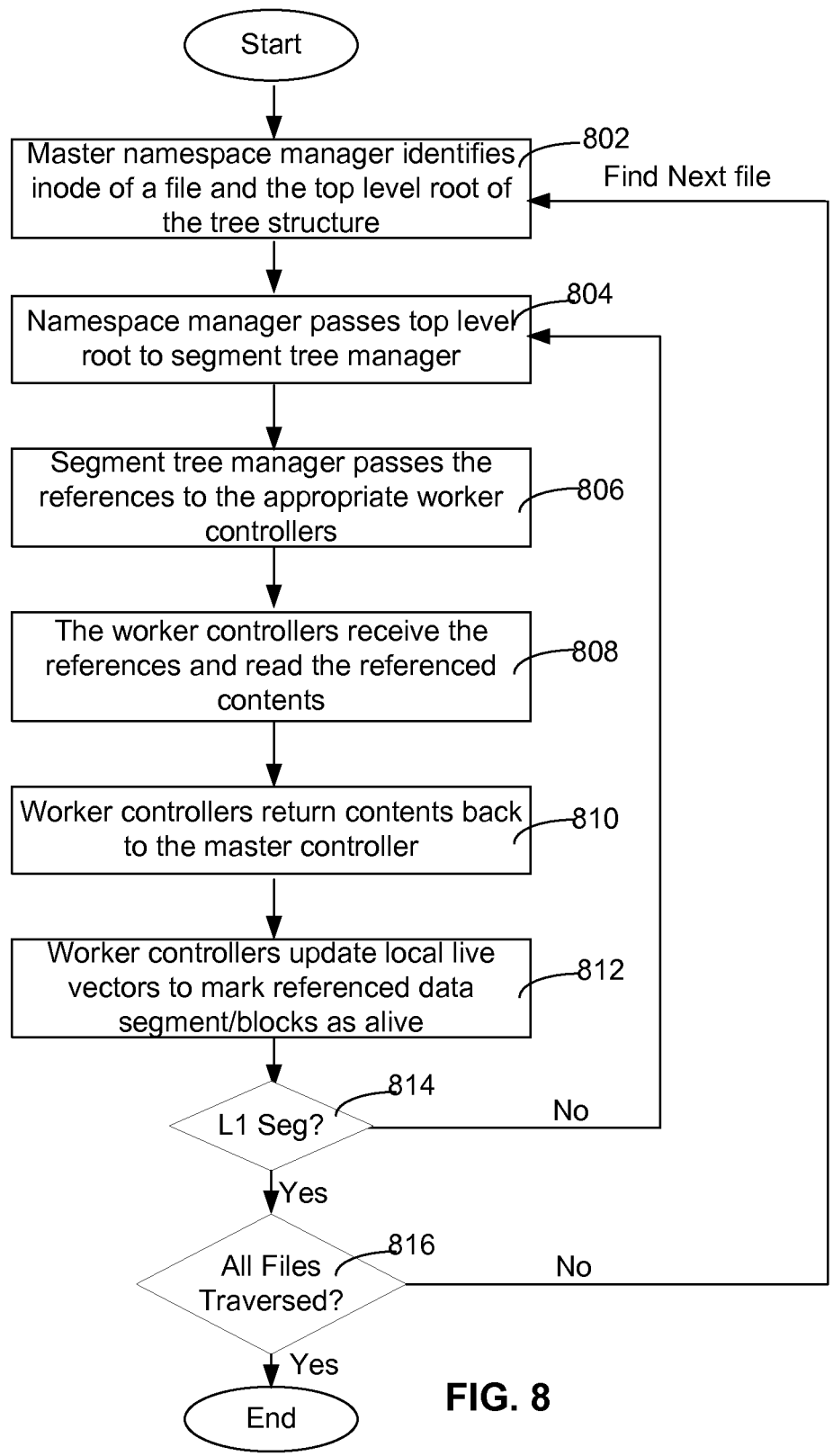
FIG. 8 is a block diagram illustrating a marking process flow in a mark-and-sweep operation.

FIG. 8 is a block diagram illustrating a marking process flow in a mark-and-sweep operation. At 802, a master namespace manager identifies the inode of a file to be traversed and from the inode identifies the top level root of the tree structure for the file. At 804, the namespace manager passes the top level root to a segment tree manager. At 806, the segment tree manager reads the next level references and passes the references to appropriate worker controllers. At 808, the appropriate worker controllers receive the references. At 810, the worker controllers return the contents back to the master controller. At 812, the local worker controllers each update a locally maintained live vector independently and asynchronously to mark all local data segments/data blocks that are referenced by the file as alive based on the references received at the local controller. The local live vector is maintained by the local worker controller and is not accessible by other worker controllers. The local live vector maintains state information regarding whether data segment/blocks local to the local controller and associated storage space are alive. At 814, a decision is made as to whether the last segment(s) read are L1 segment(s), where the L1 segments include references to the corresponding child L0 segments? If the last read references are L1 references, the process proceeds to 816, otherwise it loops back to step 804. Since this is a marking operation, we only need to know whether a data segment/block is referenced, we do not need to know the actual content of the data segment/block. As such only the references to the actual data segment need to be read. As such the file traversing can stop at reading the L1 segments. At 816, a decision is made as to whether all files of the file system have been executed? If yes, the process ends. If no, the process loops back to step 802.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing data in a de-duplicated multi-controller file system, comprising:
  receiving a data stream;
  breaking the data stream into a set of contiguous data segments;
  generating references for each of the set of contiguous data segments;
  identifying a set of de-duplicated data segments from the set of contiguous data segments;

organizing a hierarchical data structure representing the de-duplicated multi-controller file system in its entirety by a segment tree, wherein:
1) successive levels of references lead to the set of de-duplicated data segments;
2) the set of de-duplicated data segments form a bottom level of the hierarchical data structure; and
3) references referencing a bottom level data L0 segment are stored in a metadata L1 segment on a second-to-bottom level of the hierarchical data structure, such that L1 segments are parents to L0 segments;

proportioning the set of de-duplicated data segments across a plurality of controllers based at least in part by limiting co-allocation of related L0 and L1 segments to a same controller;

reclaiming memory using a mark-and-sweep garbage collection operation such that the single controller only marks local L0 segments previously co-allocated to a specified controller;

wherein each node of the hierarchical data structure includes a portion for storing data and a portion for storing metadata of the data; and wherein each of the plurality of controllers do not share storage space with any of the other controllers in the plurality of controllers.

2. The method of claim 1, wherein the hierarchical data structure is a single piece of data.

3. The method of claim 1, wherein the segment tree comprises a Merkle tree.

4. The method of claim 1, wherein each of the plurality of controllers is configured to manage one or more storage collection partitions of the file system.

5. The method of claim 1, wherein proportioning is also based on one or more of the following factors: data access pattern, quality of service guarantee, data size, data type, and backup date.

6. The method of claim 1, wherein each parent node of the hierarchical data structure includes reference(s) to its child node(s).

7. The method of claim 1, wherein the metadata includes a hash of the data.

8. The method of claim 1, wherein the set of de-duplicated data segments are variable in size.

9. The method of claim 1, wherein the file system includes a single namespace that represents all the data files of the file system.

10. The method of claim 1, wherein reclaiming memory comprises:
traversing the entire file system;
for each of a plurality of controllers of the file system updating a local live vector associated with the controller to mark all local live data segments;
wherein a data segment is marked alive if the data segment is referenced
wherein the plurality of controllers do not share storage space; and
wherein the local live vector can only be updated by a local controller.

11. The method of claim 10, wherein a local live vector is local to a controller and can only be updated by the local controller for data segments local to the controller.

12. The method of claim 10, wherein updating the local live vectors are carried out asynchronously by the plurality of controllers for their respective local storage collection partition(s).

13. The method of claim 10, further comprising:
reclaiming the storage space assigned to the data segment if the local live vector associated with the data segment does not mark the data segment as alive.

14. The method of claim 10, wherein reclaiming the storage space includes not copying forward the data segment to another storage location if the data segment is not marked alive.

15. The method of claim 10, wherein reclaiming the storage space includes putting the storage space back to a memory pool for use.

16. The method of claim 10, wherein reclaiming storage space is carried out by a local controller asynchronously from other controllers.

17. A method of processing data in a de-duplicated multi-controller file system, comprising:
receiving a data stream;
breaking the data stream into a set of contiguous data segments;
generating references for the data segments;
organizing the data segments and the references in a hierarchical data structure representing the de-duplicated multi-controller file system in its entirety by a segment tree;
deduplicating the data segments by eliminating duplicate copies of identical copies of the data segments;
wherein a set of de-duplicated data segments form a bottom level of the hierarchical data structure and references referencing a bottom level data L0 segment are stored in a metadata L1 segment on a second-to-bottom level of the hierarchical data structure;
proportioning the de-duplicated data segments across a plurality of controllers based at least in part by a load-balancing policy;
wherein the L0 and L1 segments that are related are restricted to be co-located in a same controller;
wherein each node of the hierarchical data structure includes a portion for storing data and a portion for storing metadata of the data; and
wherein each of the plurality of controllers do not share storage space with any of the other controllers in the plurality of controllers.

18. A method of processing data in a de-duplicated multi-controller file system, comprising:
traversing the file system;
for each data segment managed by a controller of the file system, updating a local live vector associated with the data segment to indicate that the data segment is alive if the data segment is referenced by a data file of the de-duplicated multi-controller file system;
wherein each data segment is organized in a hierarchical data structure representing the de-duplicated multi-controller file system in its entirety by a segment tree;
wherein a set of de-duplicated data segments form a bottom level of the hierarchical data structure and references referencing a bottom level data L0 segment are stored in a metadata L1 segment on a second-to-bottom level of the hierarchical data structure;
wherein each data segment is proportioned to be managed by the controller based at least in part by a load-balancing policy and limiting co-allocation of related L0 and L1 segments to a same controller;
wherein the controller does not share storage space with any other controllers associated with the de-duplicated multi-controller file system;

wherein each node of the hierarchical data structure includes a portion for storing data and a portion for storing metadata of the data; and wherein the local live vector is local to the controller and can only be updated by the controller.

19. A method of reclaiming storage space in a de-duplicated multi-controller file system, comprising:

representing the de-duplicated multi-controller file system in its entirety by a segment tree;

wherein a set of de-duplicated data segments form a bottom level of the segment tree and references referencing a bottom level data L0 segment are stored in a metadata L1 segment on a second-to-bottom level of the segment tree;

proportioning de-duplication across a plurality of controllers based at least in part by a load-balancing policy and limiting co-allocation of related L0 and L1 segments to a same controller;

for each of the plurality of controllers of the file system:
assigning one or more storage collection partitions to be managed by the controller;

configuring the controller to reclaim only local storage space that are not marked alive by a local live vector;

wherein the local live vector is local to the controller and can only be updated by the controller for storage spaces local to the controller;

wherein the plurality of controllers are each configured to asynchronously reclaim storage space in one or more collection partitions managed by the controller; and wherein each of the plurality of controllers do not share storage space with any of the other controllers in the plurality of controllers.

20. A de-duplicated multi-controller file system for processing data, comprising:

a process; and a memory coupled with the processor, wherein the memory is configured to provide the processor with instructions which when executed cause the processor to:

receive a set of de-duplicated data segments organized in a hierarchical data structure representing the de-duplicated multi-controller file system in its entirety by a segment tree and having successive levels of references leading to the set of de-duplicated data segments;

wherein the set of de-duplicated data segments form a bottom level of the hierarchical data structure and references referencing a bottom level data L0 segment are stored in a metadata L1 segment on a second-to-bottom level of the hierarchical data structure;

proportion the set of de-duplicated data segments across a plurality of controllers based at least in part by a load-balancing policy;

reclaim memory using a mark-and-sweep garbage collection operation such that the single controller only marks local L0 segments previously co-allocated to a specified controller;

wherein each node of the hierarchical data structure includes a portion for storing data and a portion for storing metadata of the data;

wherein each of the L0 and L1 segments are restricted to be co-allocated to a same controller; and wherein each of the plurality of controllers do not share storage space with any of the other controllers in the plurality of controllers.

21. A computer program product for processing data in a de-duplicated multi-controller file system, the computer program product being embodied in a computer readable storage medium and comprising computer instructions for:

receiving a set of de-duplicated data segments organized in a hierarchical data structure representing the de-duplicated multi-controller file system in its entirety by a segment tree and having successive levels of references leading to the set of de-duplicated data segments;

wherein the set of de-duplicated data segments form a bottom level of the hierarchical data structure and references referencing a bottom level data L0 segment are stored in a metadata L1 segment on a second-to-bottom level of the hierarchical data structure;

proportioning the set of de-duplicated data segments across a plurality of controllers based at least in part by a load-balancing policy and limiting co-allocation of related L0 and L1 segments to a same controller;

reclaiming memory using a mark-and-sweep garbage collection operation such that the single controller only marks local L0 segments previously co-allocated to a specified controller;

wherein each node of the hierarchical data structure includes a portion for storing data and a portion for storing metadata of the data;

wherein each of the de-duplicated data segments and all reference(s) referencing the de-duplicated data segment are restricted to be co-allocated to a single controller; and wherein each of the plurality of controllers do not share storage space with any of the other controllers in the plurality of controllers.

* * * * *